Figure 1:
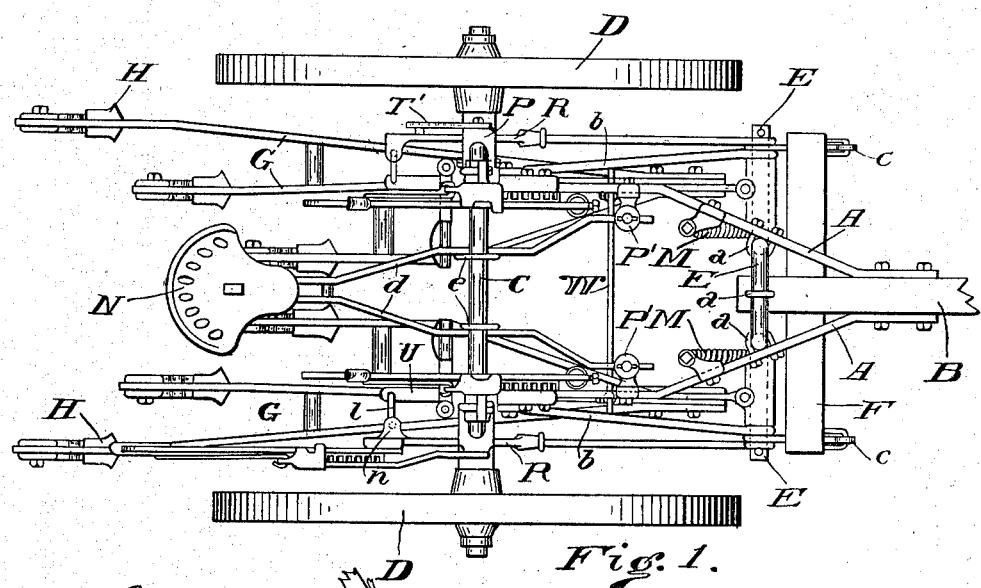

No. 736,113. PATENTED AUG. 11, 1903.
W. R. KNAUB.
CULTIVATOR.
APPLICATION FILED AUG. 13, 1902.
NO MODEL. 3 SHEETS—SHEET 1.

Witnesses
Inventor
William R Knaub
by Alfred M Allen
Attorney

No. 736,113. PATENTED AUG. 11, 1903.
W. R. KNAUB.
CULTIVATOR.
APPLICATION FILED AUG. 13, 1902.
NO MODEL. 3 SHEETS—SHEET 2.

Witnesses
Inventor
William R Knaub
by Alfred M Allen
Attorney

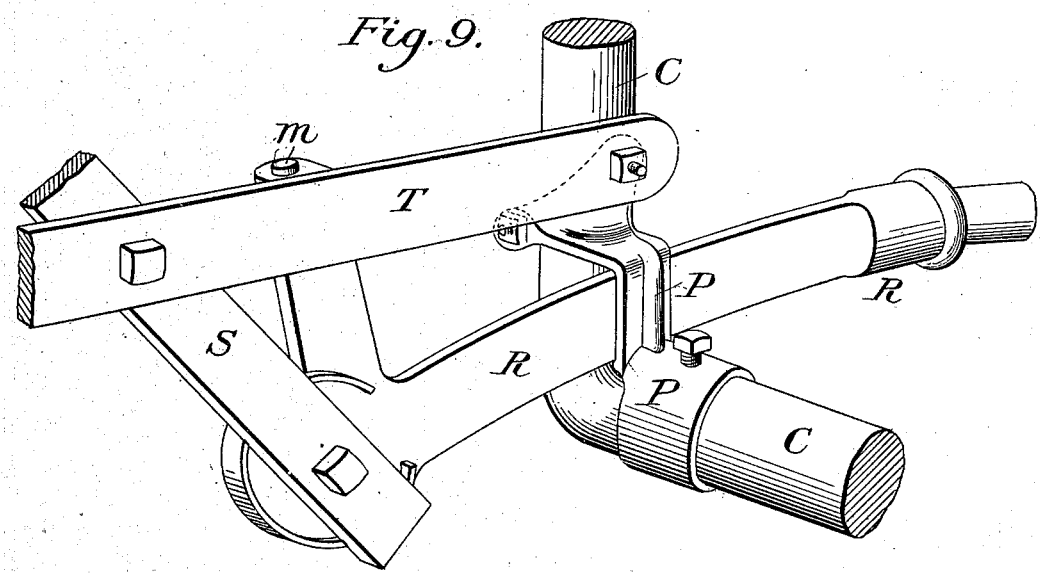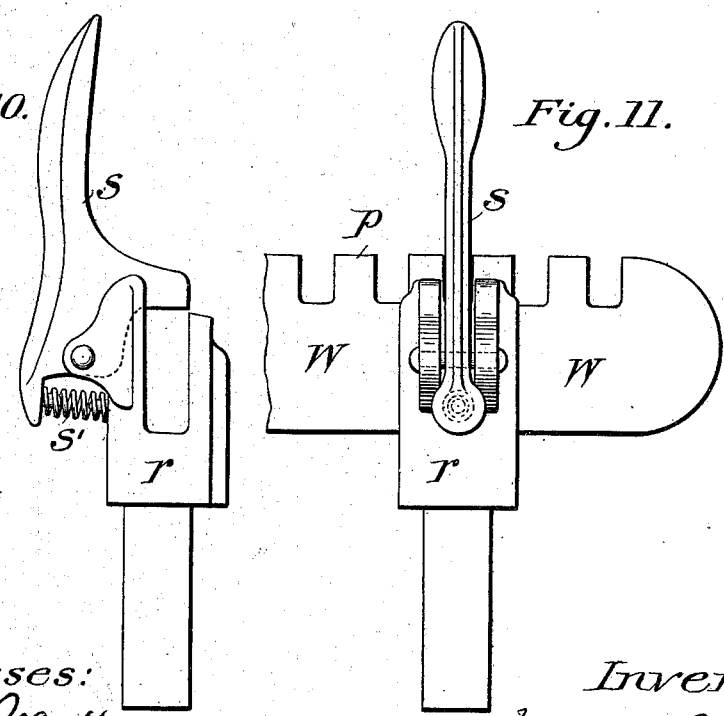

No. 736,113. Patented August 11, 1903.

UNITED STATES PATENT OFFICE.

WILLIAM R. KNAUB, OF DAYTON, OHIO, ASSIGNOR TO THE OHIO RAKE COMPANY, OF DAYTON, OHIO, A CORPORATION OF OHIO.

CULTIVATOR.

SPECIFICATION forming part of Letters Patent No. 736,113, dated August 11, 1903.

Application filed August 13, 1902. Serial No. 119,478. (No model.)

*To all whom it may concern:*

Be it known that I, WILLIAM R. KNAUB, a citizen of the United States, residing in Dayton, county of Montgomery, and State of Ohio, have invented certain new and useful Improvements in Cultivators, of which the following is a full, clear, and exact description, reference being had to the accompanying drawings, forming part of this specification.

My invention relates to straddle-row cultivators intended to be used as a balanced-frame riding-cultivator or as a walking-cultivator, and the first part of my improvements relate to the means provided for shifting the carrying-axle and wheels with relation to the frame, so as to properly balance the driver in his seat and in connecting the foot-levers for shifting the gangs to the axle-shifting mechanism in order that the fulcrum for the foot-levers may always maintain a fixed position with reference to the frame, no matter to what position the carrying-axle may be shifted. Heretofore it has been sought in a riding-cultivator to shift the gangs from the seat by foot-levers pivoted to the gangs and fulcrumed on the carrying-axle; but when the axle is shifted to balance the driver the fulcrum-point of attachment is consequently changed, so that for certain positions of the carrying-axle a proper leverage for the gang shifting is not maintained. With my improvements, however, this leverage is always constant, as the shifting of the carrying-axle to change the balance of the implement does not affect the fulcrum of the gang foot-levers.

A second feature of my improvements consists of a certain novel construction of pressure-springs, whereby the proper spring-pressure may be obtained for the gangs in both directions vertically, whereby both springs are located above the gangs, so as to avoid damage by striking obstructions.

The third feature of my improvement consists of the certain novel construction of spacing-bar for separating and regulating the distance apart of the gangs with a lock for same, by means of which the spacing of the gangs may be adjusted by the driver without leaving his seat.

A fourth feature of improvement consists in the certain novel spring-pressure or bumper device for supporting the inner ends of the seat-supports, which supports are pivoted to the axle, so that the seat may be thrown up out of the way when the implement is to be used as a walking-cultivator.

There are also other features of improvement in details of construction, which will be hereinafter more particularly pointed out and claimed.

Figure 2:
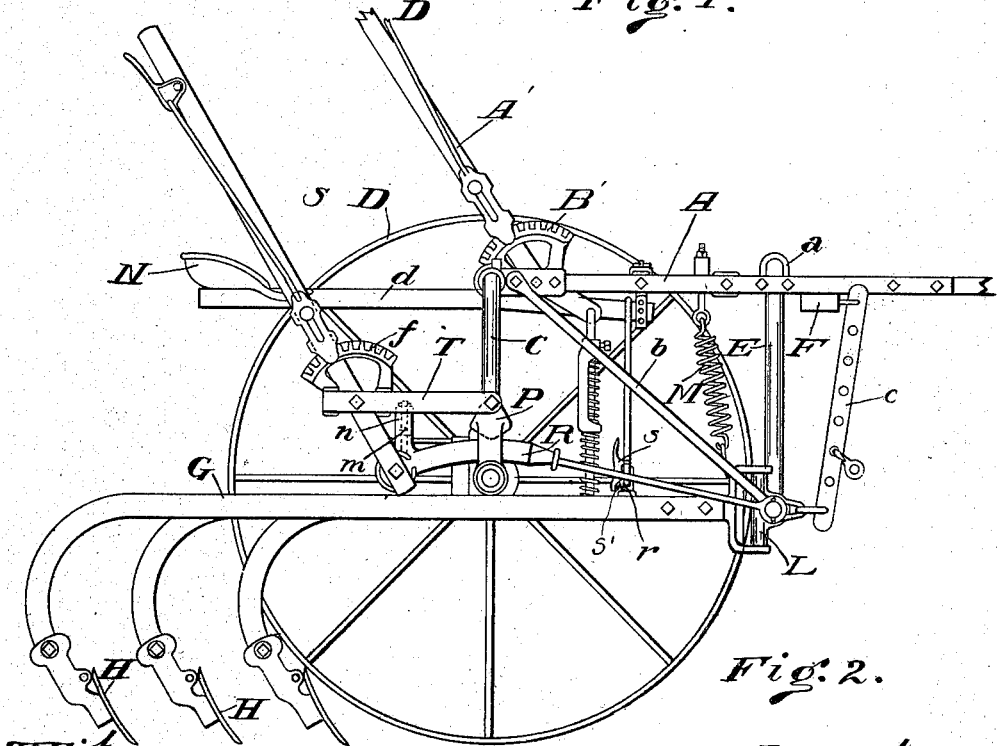
Figure 8:
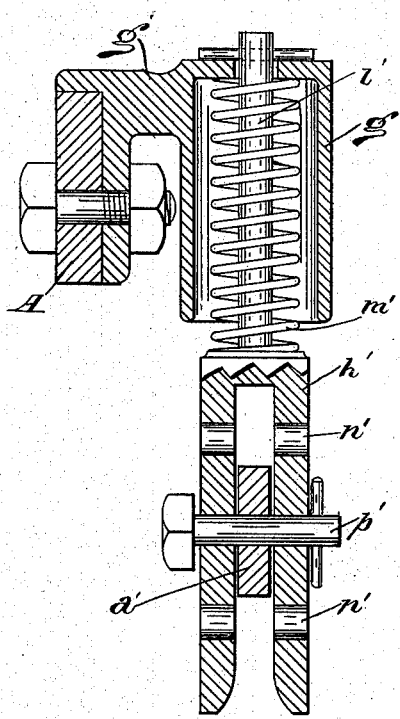
Figure 6:
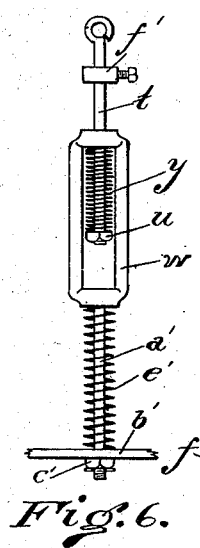
Figure 5:
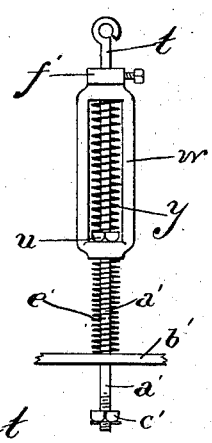
Figures 4, 7:
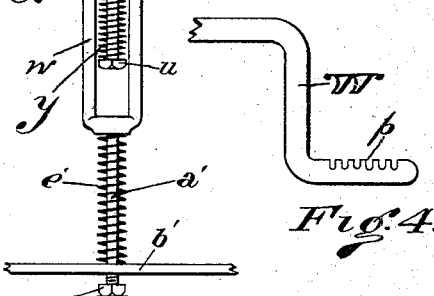
Figure 3:
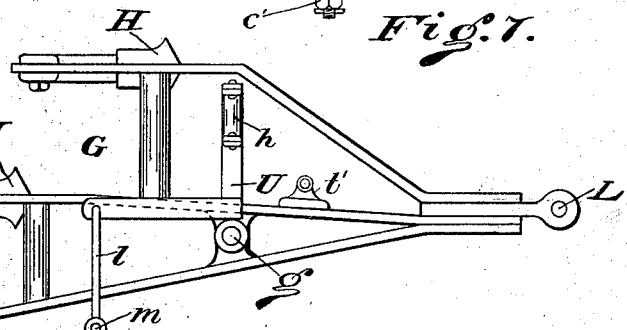

In the drawings, Figure 1 is a plan view of my improved cultivator. Fig. 2 is a side elevation of same with the near carrying-wheel removed. Fig. 3 is a plan view of one of the cultivator-gangs, showing the foot-lever for shifting same. Fig. 4 is a detail of one end of the spacing-bar. Figs. 5, 6, and 7 are detail views of the spring-pressure device for the gangs, showing same in different positions of tension. Fig. 8 is a detail vertical section of the spring-supporting device for the inner ends of the seat-bars. Fig. 9 is a detail perspective view of a portion of the machine, showing the construction for shifting the carrying-axle with reference to the frame. Fig. 10 is a side elevation of the latch for securing the spacing-bar. Fig. 11 is a front elevation of same.

A A are the hounds, securely bolted at the front to the tongue B and carrying pivoted on the rear ends the arched axle C, upon which axle are journaled the carrying-wheels D D of the implement. Between the hounds A A near their forward ends and to the tongue is secured by the clips $a$ $a$ the arched shaft E, the depending arms of which are braced by the rearwardly and upwardly extending rods $b$ $b$, secured at the lower ends of the shaft E and to the rear ends of the hounds, so that a rigid and substantial framework is obtained for the machine.

F is the doubletree, carrying the depending perforated links $c$, which are coupled to the lower ends of the shaft E, and to which the swingletrees for the proper draft are coupled.

G G are the usual three-part drag-bars, carrying the hoes H H at their lower ends, properly braced together and provided with the swivel-joint connection L at their forward end by which they are mounted on the outer ends of the shaft E, so that the two gangs of cultivator-hoes may have both lateral and vertical movement. In order that the gangs may be easily handled and operated, they are supported by the coiled springs M M, which are secured to the hounds A A at their upper ends and coupled to the swivel-joints L at their lower ends.

N is the driver's seat, mounted on the bars $d$ $d$, pivoted on the carrying-axle C by the clips $e$ $e$, and the inner ends of which arms rest in and are secured to the spring-supports P', secured to the hounds, and which supports will be hereinafter particularly described.

In order to shift the carrying-wheels and axle of the implement to balance the driver in his seat, I provide as follows: Securely bolted to the carrying-axle C at the lower angle of the depending portions are the castings P P. These castings are bolted to the vertical portion and secured by set-screws to the horizontal portion of the carrying-axle C, so that space is left between the vertical portion of the casting and the vertical portion of the axle, and through these spaces the bars R R pass, which bars are secured at their forward ends of the shaft E outside of the swivel-joint L of the gangs. To the outer end of one of these bars R is pivoted the hand-lever S, connected by the link T with the casting P, secured to the carrying-axle. $f$ is a segment-rack, mounted on the link T for locking the lever S in any desired position in the usual way. It will be seen that by operating the lever S, inasmuch as the bar R is secured to the frame in front, the effect will be to push forward or draw back the casting P and with it the carrying axle and wheels, so that the driver sitting in his seat by operating the lever S can change the position of the carrying-wheels with reference to the frame, and thus properly balance his weight. In order that this operation of the lever S, which is only located on one side, may not have a tendency to twist the axle, I provide on the opposite side the link T', coupling the casting P with the rear end of the bar R. This link T' can either be perforated or provided with rack-teeth to engage a pin on the arm R, so that proper adjustment may be had.

Pivoted vertically one on each gang at $g$ is the bell-crank lever U, one arm of which carries the pivoted stirrup-piece $h$ for the foot of the operator and the other arm of which is connected by the link $l$ with a vertical spindle $m$, mounted on a suitable upright portion $n$ of the bar R at its rear end. It will be seen from this construction that the driver by pushing forward or back on the stirrup-pieces $h$ will swing the bell-crank lever into different positions, and inasmuch as the other arm of the bell-crank lever is connected or fulcrumed to the spindle $m$ on the bar R the result of the movement of the bell-crank lever will be to shift the gangs from side to side.

It will be understood that the connecting of the bell-crank levers with the arms R is by the vertical spindles in order to permit of the vertical adjustment of the gangs, as will be hereinafter set forth. It will be further seen from the construction described that no matter what position the carrying-axle may be shifted into by the lever S the connection between the bell-crank-shifting levers for the gangs and the fulcrum-point of the spindle $m$ will remain in the same position, because both the gangs and bars R are secured on the fixed shaft E.

W is the spacing-bar for connecting the two gangs together for simultaneous movement. This spacing-bar is of the usual arched construction, and the outwardly-extending lower arms of the spacing-bar are provided on their upper edge with rack-teeth $p$, the lower ends of the bar engaging in the bifurcated castings $r$, which are mounted by their depending spindle portions in the socket $t'$, secured to the gangs.

$s$ is a spring-pressed latch, with spring $s'$, which engages the teeth of the rack, so that by releasing these latches the driver without leaving his seat can separate or bring together the two gangs, the ends of the spacing-bar sliding in the castings $r$. Then by releasing the latches $s$ the gangs are locked in any desired position, the tooth of the latch engaging the space between the teeth $p$ of the spacing-bar.

For the purpose of providing suitable spring-pressure for the gangs I provide as follows, the construction for each gang being the same: A' is a hand-lock lever locked in position by the segment-rack B'. The lower end of this lever is connected onto the rod $t$, which has a nut $u$ at its lower end, and which slides loosely in the spring-case $w$. Between the nut $u$ and the top of the spring-case on the rod $t$ is mounted the coiled spring $y$. The spring-case $w$ carries the rod $a'$, extending down through an opening in the plate $b'$, mounted on the gang drag-bars, and $c'$ is an adjustable nut mounted on this rod below the plate. $e'$ is a coiled spring mounted on the rod $a'$, bearing between the plate $b'$ and the spring-case $w$. $f'$ is a collar on the rod $t$ above the spring-case $w$ and provided with a set-screw for adjustment.

When the operator pushes forward the lever A', the rod $t$, bearing against the bottom of the spring-case, the coiled spring $e'$ is compressed and the proper tension exerted on the gangs, as illustrated in Fig. 5. The gang itself, however, by reason of the loose sliding connection of the spring-case W with the rod $t$, can drop or be depressed into a dead furrow, in which event the spring $y$ in the spring-case will be compressed, and in this way it will be seen the gangs have spring-pressure in both directions. Now it sometimes happens in certain kinds of soil that there is a tendency of the gangs to draw too deep in the ground, thus compressing the spring $y$, and to overcome this tendency the operator compresses the spring $y$ and then drops down and secures the set-screw collar $f'$, as shown in Fig. 7. When this is done, the spring $y$ is locked out of play and the lower spring $e'$ acts alone for the down-pressure, and the tendency of the gangs to draw too deep is overcome.

For supporting the driver's seat I provide the spring-case $g'$, as shown in Fig. 8, one on each side, bolted to the hounds A. $h'$ is a bifurcated plate for receiving the inner ends of the seat-bars $d$, which plate carries the spindle $l'$, passing up through an opening in the spring-case and surrounded by a coiled spring $m'$, and there is thus provided a spring-seat for the bars. The bifurcated plate is provided with openings $n'$ $n'$, so that the seat-bars may be adjusted at different heights, as desired, by the pins $p'$.

Having thus described my invention, what I claim, and desire to secure by Letters Patent, is—

1. In a straddle-row cultivator, the combination, with the frame, and carrying-axle pivoted thereto, of a bar coupled to the frame extending back to the rear of the carrying-axle, with lever fulcrumed on said bar and a link connecting said lever with the carrying-axle, whereby the carrying-axle may be shifted with reference to the frame, substantially as shown and described.

2. In a straddle-row cultivator, the combination, with the frame and carrying-axle pivoted thereto, of cultivator-gangs pivoted to the frame, so as to have lateral and vertical movement, a bar coupled to the frame extending back to the carrying-axle, with lever fulcrumed thereon, a link connecting said lever with the carrying-axle, and foot-operative mechanism for shifting the gangs laterally, with coupling connection therefor to said frame-bar, whereby the carrying-axle may be shifted without altering the fulcrum of the gang-shifting mechanism, substantially as shown and described.

3. In a straddle-row cultivator, the combination with the frame and carrying-axle pivoted thereto, of cultivator-gangs pivoted to the frame so as to have a lateral movement, a bar coupled to the frame extending back to the carrying-axle, with lever fulcrumed thereon, a link connecting said lever with the carrying-axle, a bell-crank lever mounted on the cultivator-gang, with vertical pivot therefor, a stirrup for operating same, and a connecting-rod coupling said bell-crank lever to the frame-bar, whereby the carrying-axle may be shifted without altering the fulcrum of the gang-shifting mechanism, substantially as shown and described.

4. In a straddle-row cultivator, the combination with the frame and cultivator-gangs pivoted thereto, so as to have a vertical movement, of spring-pressure devices therefor consisting of a depending rod with a head at its lower end, a spring-case loosely mounted on said rod, carrying a second headed rod, a plate on the gang-frame with an aperture through which said second rod passes, and springs mounted in the spring-case and on the second rod to give spring-pressure to the gangs in both directions, substantially as shown and described.

5. In a straddle-row cultivator, the combination, with the frame and cultivator-gangs pivoted thereto, so as to have vertical movement, of spring-pressure devices therefor consisting of a depending rod with a head at its lower end, and the adjustable collar thereon, a spring-case mounted on said rod below said adjustable collar, carrying a second headed rod, plate on the gang with an aperture through which said second rod passes, and springs mounted in the spring-case and on the second rod for giving tension to the gang in both directions, and whereby the upper tension-spring may be locked out of operation, substantially as shown and described.

6. In a straddle-row cultivator, the combination, with the frame, and cultivator-gangs pivoted thereto, so as to have an independent lateral movement, of a spacing-bar to couple said gangs together, said spacing-bar having teeth formed on its upper edge at the ends, with castings on the cultivator-gangs, through which the ends of the spacing-bar play and a latch at each casting to engage the teeth of the spacing-bar whereby the adjustment of the distance between the gangs may be regulated by the driver without leaving his seat, substantially as shown and described.

WILLIAM R. KNAUB.

Witnesses:
FRANK N. TRISSEL,
W. D. GRAVES.